(12) United States Patent
Jeon

(10) Patent No.: US 6,266,378 B1
(45) Date of Patent: Jul. 24, 2001

(54) DATA DETECTOR AND DATA DETECTION METHOD WHICH MEASURE AND CORRECT FOR PHASE DIFFERENCES BETWEEN A SAMPLING POINT AND AN OPTIMAL DETECTION POINT

(75) Inventor: Jin-kyu Jeon, Suwon (KR)

(73) Assignee: Samsung Electronics Co., Ltd., Kyundki-Do (KR)

(*) Notice: Subject to any disclaimer, the term of this patent is extended or adjusted under 35 U.S.C. 154(b) by 0 days.

(21) Appl. No.: 09/100,084

(22) Filed: Jun. 19, 1998

(30) Foreign Application Priority Data

Aug. 21, 1997 (KR) .................................................. 97-39945

(51) Int. Cl.$^7$ ...................................................... H04L 23/02
(52) U.S. Cl. .......................... 375/262; 375/341; 714/794
(58) Field of Search .................................. 375/341, 262; 714/794

(56) References Cited

U.S. PATENT DOCUMENTS

| | | | |
|---|---|---|---|
| 5,442,492 | 8/1995 | Cunningham et al. | 360/46 |
| 5,455,813 | 10/1995 | Hayashi | 369/59 |
| 5,553,104 | * 9/1996 | Takashi et al. | 375/373 |
| 5,606,540 | 2/1997 | Hayashi | 369/59 |
| 5,625,632 | * 4/1997 | Ishida et al. | 371/43 |
| 5,663,945 | * 9/1997 | Hayashi et al. | 369/124 |
| 5,742,576 | 4/1998 | Hayashi et al. | 369/59 |
| 5,745,315 | 4/1998 | Aoyama | 360/65 |
| 5,748,045 | 5/1998 | Tateishi | 331/17 |
| 5,790,613 | 8/1998 | Tateishi | 375/376 |
| 5,805,024 | 9/1998 | Takashi et al. | 331/17 |
| 5,867,333 | 2/1999 | Saiki et al. | 360/51 |
| 5,870,591 | * 2/1999 | Sawada | 395/555 |
| 5,937,020 | 8/1999 | Hase et al. | 375/376 |
| 5,940,449 | * 8/1999 | Kaaden et al. | 375/341 |
| 5,963,518 | 10/1999 | Kobayashi et al. | 369/48 |
| 5,995,465 | 11/1999 | Hayashi et al. | 369/59 |

FOREIGN PATENT DOCUMENTS

| | | | |
|---|---|---|---|
| 0 530 775 | 3/1993 | (EP) | G11B/20/14 |
| 4-89664 | 3/1992 | (JP) | G11B/20/10 |
| 5-135510 | 6/1993 | (JP) | G11B/20/14 |
| 6-105892 | 7/1994 | (JP) | G11B/20/14 |
| 9-7304 | 1/1997 | (JP) | G11B/20/10 |

OTHER PUBLICATIONS

R.D. Cidecyan et al.: "A PRML System for Digital Magnetic Recording" IEEE Journal on Selected Areas in Communications, vol. 10, No. 1, Jan. 1992, pp. 38–56, XP000457625.

* cited by examiner

Primary Examiner—Stephen Chin
Assistant Examiner—Dac V. Ha
(74) Attorney, Agent, or Firm—Sughrue, Mion, Zinn Macpeak & Seas, PLLC

(57) ABSTRACT

A data detector and a data detection method. The data detector includes: a converter for converting received data into digital data according to a sampling clock signal; a maximum likelihood decoder for performing maximum likelihood decoding on the digital data; and a generator for measuring a phase difference between the digital data sampled at a desired detection point among a predetermined number of optimal detection points of the received signal and each of a number of reference levels according to the predetermined number of optimal detection points. The generator further generates a control signal for changing the phase of the sampling clock signal according to the measured phase difference. The phase of the sampling points, as data detection points, is made to match the phase of optimal detection points, so that errors caused by differences in phase are minimized, thereby enhancing performance of the maximum likelihood decoder, and enhancing performed in the overall detection of reproduced data.

28 Claims, 12 Drawing Sheets

CLK_3DIV

PB CLK

CTL0

CTL1

FIG. 8E

| PB CLOCK | CTL0 | CTL1 |
|----------|------|------|
| 0        | 0    | 0    |
| 1        | 1    | 0    |
| 2        | 1    | 1    |
| 3        | 0    | 0    |
| 4        | 1    | 0    |
| ⋮        | ⋮    | ⋮    |

REPEATS EVERY THREE CYCLES OF PB CLOCK

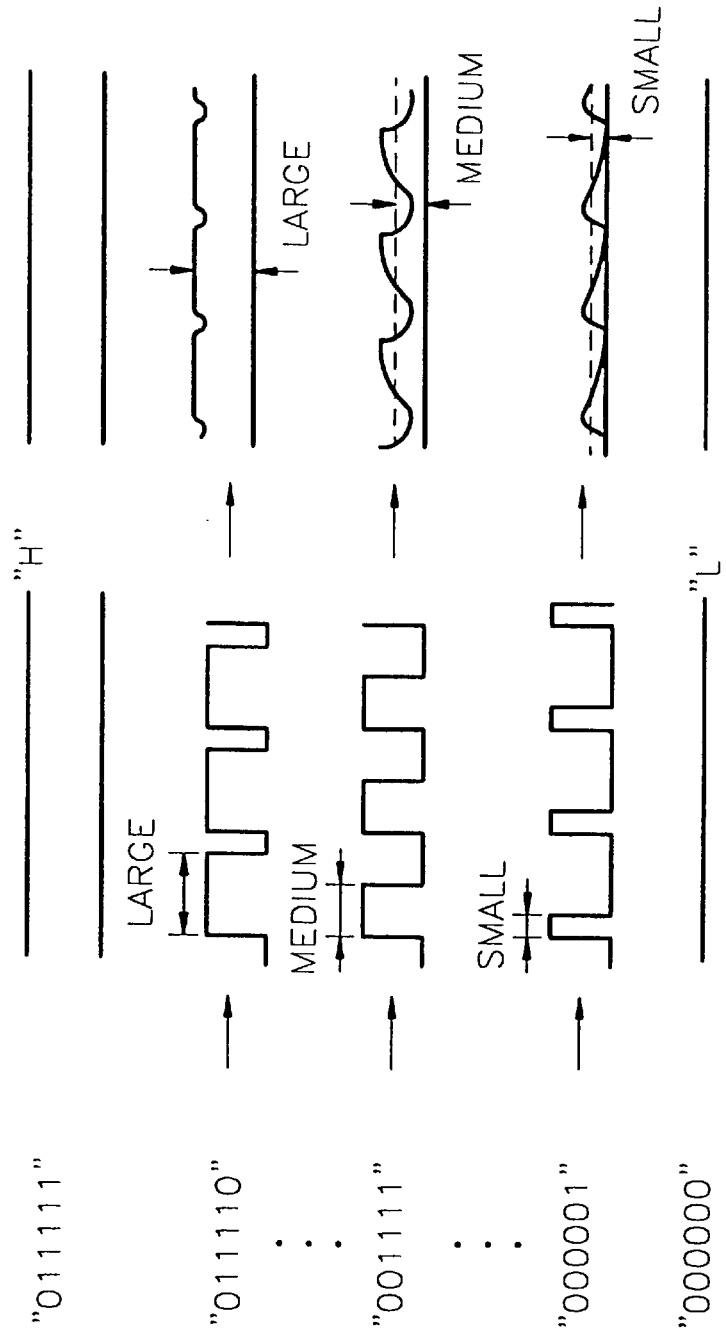

DATA DETECTOR AND DATA DETECTION METHOD WHICH MEASURE AND CORRECT FOR PHASE DIFFERENCES BETWEEN A SAMPLING POINT AND AN OPTIMAL DETECTION POINT

The following disclosure is based on Korean Patent Application No. 97-39945 filed on Aug. 21, 1997, the disclosure of which is incorporated hereby into this application by reference.

BACKGROUND OF THE INVENTION

1. Field of the Invention

The present invention relates to data detection and, more particularly, to a data detector for improving performance in maximum likelihood detection, and a method therefor.

2. Description of the Related Art

Signal processing technology relating to partial response maximum likelihood (PRML) decoding, including a Viterbi decoding process, has been applied to increase recording density without drastically changing the characteristics of the conventional recording/reproducing apparatuses themselves. Many devices for implementing such technology have been suggested.

FIG. 1 is a block diagram showing the recording/reproducing unit of a digital videocassette recorder (VCR) having a partial response (PR) 4 (+1,0,−1) type. In FIG. 1, input data to be recorded is modulated by a precoder 102. That is, the output of an adder 104 of the precoder 102 is delayed by a time corresponding to 2 bits of the input data, by two unit delays (D) 106 and 108, and then fed back to the adder 104. The adder 104 performs an exclusive OR operation on the input data and the feedback data. Such operation of the precoder 102 converts the input data into interleaved non-return to zero inversion (NRZI) data. Here, D represents a unit delay corresponding to 1 bit of the input data.

A recording amplifier 110 of a driven-by-current type carries enough current through a recording head HD1 of a channel 112 such that data is recorded on a recording medium T in an optimal state. A signal reproduced by a reproducing head HD2 of the channel 112 is amplified to a desired amplitude by a playback amplifier 114. An equalizer 116 compensates for distortion in the waveform and amplitude of the reproduced signal. The compensation involves removing a DC component and transmitting only a high frequency component which indicates transition of record data as a differential type pulse, due to a differential characteristic of the channel 112. Here, the reproduced signal output from the playback amplifier 114 after being amplified is a PR(+1,−1) type signal.

The differential type channel characteristic means (1−D). A channel demodulator 118 having a (1+D) integral characteristic converts the PR(+1,−1) type signal output from the equalizer 116 into a PR4(+1,0,−1) type signal, so that the signal modulated by the precoder 102 of the recorder is demodulated into the original record data. Here, the channel demodulator 118 includes a delay 120 for delaying the output of the equalizer 116 by a unit bit (1 bit), and an adder 122 for adding a signal delayed by the delay 120 to the output of the equalizer 116. A clock generator 124 detects the timing of the reproduced signal equalized by the equalizer 116 using an internal phase locked loop (PLL) circuit to generate the clock signal required for a data detector 126.

The data detector 126 includes an analog-to-digital converter (ADC) 128 and a digital Viterbi decoder 130. The ADC 128 converts the output of the channel demodulator 118 into digital data according to a sampling clock signal generated by the clock generator 124, and the digital Viterbi decoder 130 decodes the digital data using a Viterbi decoding algorithm, which is a maximum likelihood decoding algorithm, according to a driving clock signal generated by the clock generator 124. Since a sampling point of the ADC 128 corresponds to a detection point for the reproduced data, the sampling point is a critical factor determining the performance of the digital Viterbi decoder 130. However, the conventional data detector 126 shown in FIG. 1 cannot process a continuously varying signal, so a phase error occurs between the sampling point and the actual optimal detection point. As a result, Viterbi decoding performance is lowered.

SUMMARY OF THE INVENTION

To solve the above problems, it is an object of the present invention to provide a data detector which adaptively matches the phase of sampling points of an input signal, as data detection points, with the phase of optimal detection points of an actual reproduced signal, while maximum likelihood decoding is performed on reproduced data.

It is another object of the present invention to provide a data detection method for adaptively matching the phase of sampling points of an input signal, as data detection points, with the phase of optimal detection points of an actual reproduced signal, while maximum likelihood decoding is performed on reproduced data.

To achieve the first object, there is provided a data detector comprising a converter, a maximum likelihood decoder and a generator. The converter converts received data into digital data according to a sampling clock signal, and the maximum likelihood decoder performs maximum likelihood decoding on the digital data. The generator measures a phase difference between the digital data sampled at a desired detection point among a predetermined number of optimal detection points of the received signal and each of a number of reference levels according to the predetermined number of optimal detection points. It also generates a control signal for changing the phase of the sampling clock signal according to the measured phase difference. Preferably, the data detector of the present invention further comprises a phase shifter for shifting the phase of the sampling clock signal according to the control signal.

To achieve the second object, there is provided a data detection method comprising the steps of: (a) converting a received signal into digital data according to a sampling clock signal; (b) performing maximum likelihood decoding on the digital data; and (c) measuring a phase difference between the digital data sampled at a desired detection point among a predetermined number of optimal detection points of the received signal and each of a number of reference levels according to the predetermined number of optimal detection points, and generating a control signal for changing the phase of the sampling clock signal according to the measured phase difference. Preferably, the data detection method of the present invention further comprises the step (d) of shifting the phase of the sampling clock signal according to the control signal and feeding back a shifted clock signal to the step (a).

BRIEF DESCRIPTION OF THE DRAWINGS

The above objects and advantages of the present invention will become more apparent by describing in detail preferred embodiments thereof with reference to the attached drawings in which:

FIGS. 7A through 7L are operational waveforms for the phase detector and error voltage generator shown in FIG. 6;

FIG. 8E is a table of combinations of a selection control signal;

FIGS. 9A, 9B and 9C are operational waveforms of the input and output signals of a PWM generator and the output signal of a low pass filter of FIG. 6 according to phase differences;

DESCRIPTION OF THE PREFERRED EMBODIMENTS

Figure 1:
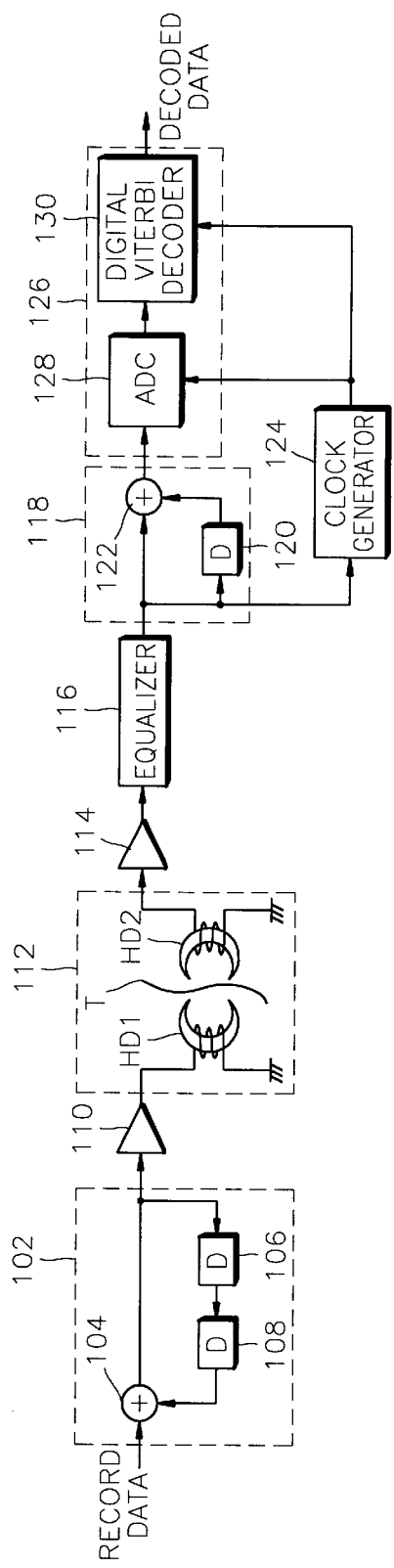
FIG. 1 is a block diagram showing the structure of a recording/reproduction system of a digital videocassette recorder (VCR) having a conventional data detector.
Figure 2:
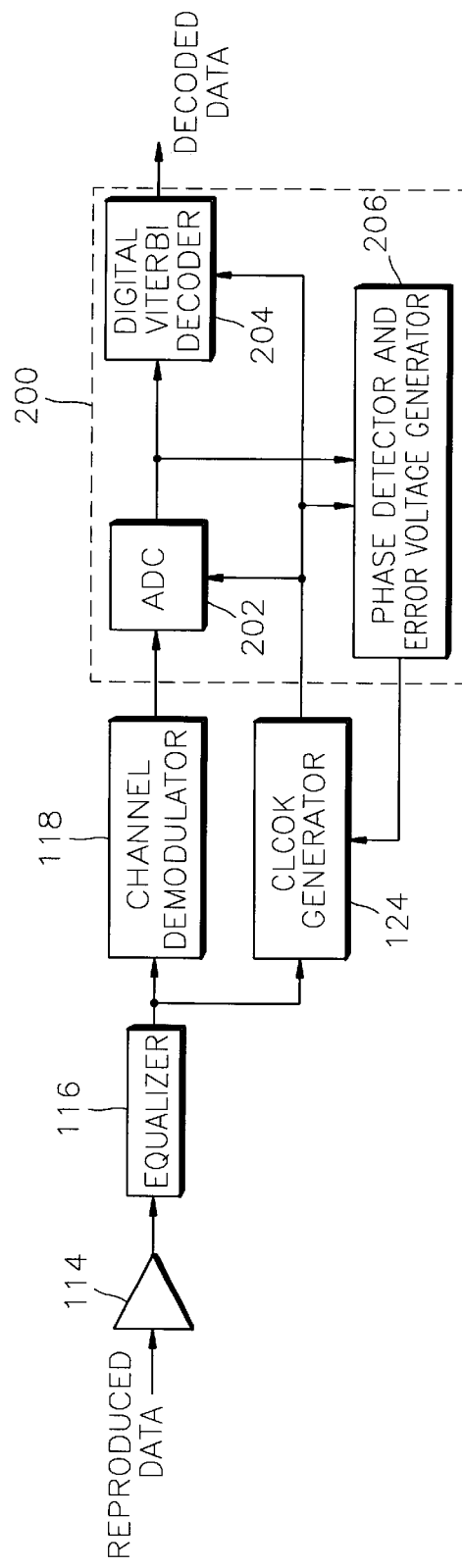
FIG. 2 is a block diagram of a reproduction system having a data detector according to a preferred embodiment of the present invention.

In FIG. 2, a playback amplifier 114, an equalizer 116, a channel decoder 118 and a clock generator 124 are the same or equivalent to the analogous components of FIG. 1. Thus a detailed explanation thereof will be omitted.

As shown in FIG. 2, a data detector 200 according to an embodiment of the present invention includes an ADC 202, a digital Viterbi decoder 204, and a phase detector and error voltage generator 206. The data detector 200 differs from the conventional data detector 126 in that it includes the phase detector and error voltage generator 206 which: (a) detects a phase error of the reproduced signal output from the ADC 202 according to driving clock signals (playback clock signal and inverted playback clock signal) generated by the clock generator 124, (b) generates a voltage signal corresponding to the detected phase error, and (c) controls the phase of sampling points of the ADC 202 by applying the generated voltage signal to the clock generator 124.

Figure 3:
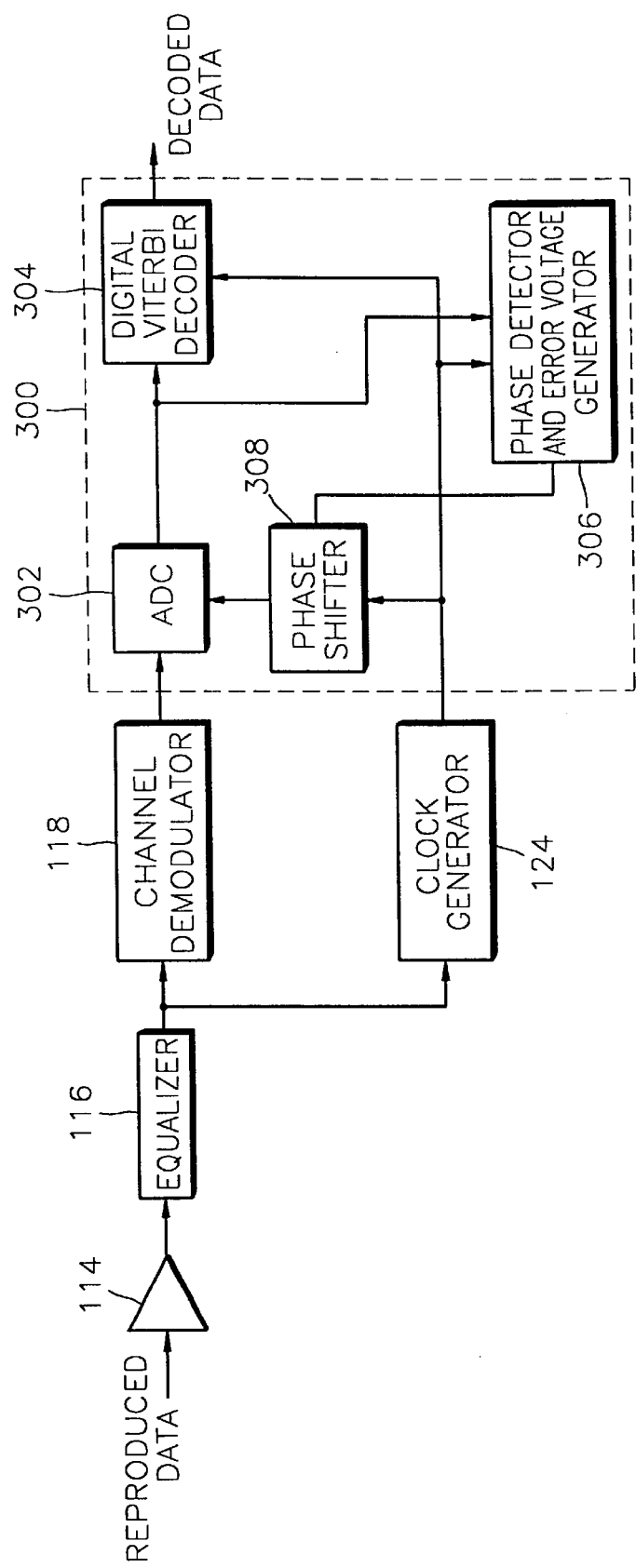
FIG. 3 is a block diagram of a reproduction system having a data detector according to another embodiment of the present invention.

FIG. 3 is a block diagram of a reproduction system having a data detector 300 according to another embodiment of the present invention. Unlike the data detector 200 of FIG. 2, the data detector 300 of FIG. 3 further includes a phase shifter 308 which shifts the phase of a sampling clock signal, generated by the clock generator 124, according to a voltage signal corresponding to the phase error generated by the phase detector and error voltage generator 306, and applies the result to an analog-to-digital converter (ADC) 302.

That is, in the data detector 200 of FIG. 2, the clock generator 124 includes a function for shifting a sampling clock signal according to the voltage signal corresponding to the phase error generated by the phase detector and error voltage generator 206. However, the data detector 300 of FIG. 3 includes the separate phase shifter 308 to perform that function.

The operation of the data detector according to the present invention will be described based on the data detector 300 of FIG. 3, for convenience in explanation.

First, the ideal sampling point of the ADC 302, as a detection point of the reproduced data, will be considered. This is the case shown in FIG. 4, where the sampling point is at the optimal detection point, thereby enhancing decoding performance of the digital Viterbi decoder 304. The digital Viterbi decoder 304 may use any of the various Viterbi decoding algorithms, the details of which are well known and thus not discussed here.

On the other hand, the level of the signal input to the ADC 302 is also important. However, it is assumed that the playback amplifier 114 uses automatic gain control (AGC) to maintain a constant level of the reproduced signal provided to the ADC 302. Accordingly, the effect of variation in the level of the input reproduced signal is disregarded, and for this explanation, it is assumed that the digital output level of the ADC 302 with respect to an analog input signal has a 6-bit linear quantization characteristic: that is, "−1" is converted to "000000", "0" to "011111", and "+1" to "111111".

Figure 4:
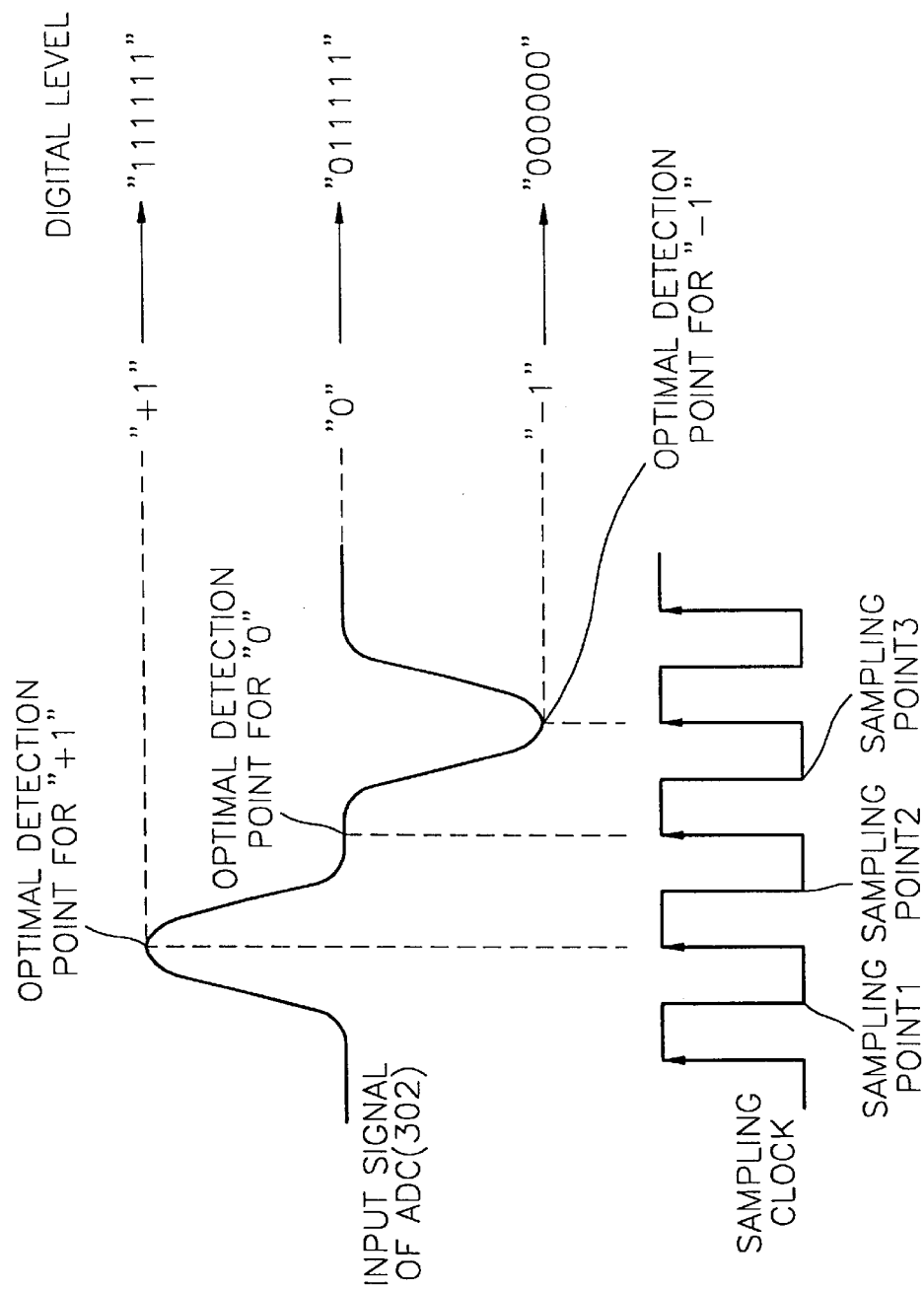
FIG. 4 shows an ideal case where the phase of the optimal detection points and the phase of the sampling points coincide with each other, for assisting understanding of the present invention.

Generally, the ADC 302 is comprised of a sample & hold circuit, and the analog value of the input reproduced signal at only the sampling point is output as a digital value. As shown in FIG. 4, the reproduced signal input to the ADC 302 has three optimal detection points "+1", "0" and "−1". That is, in the ideal case, the sampling points coincide with the optimal detection points. Then, the ADC 302 has no negative effect at all on the performance of the digital Viterbi decoder 304.

Figure 5:
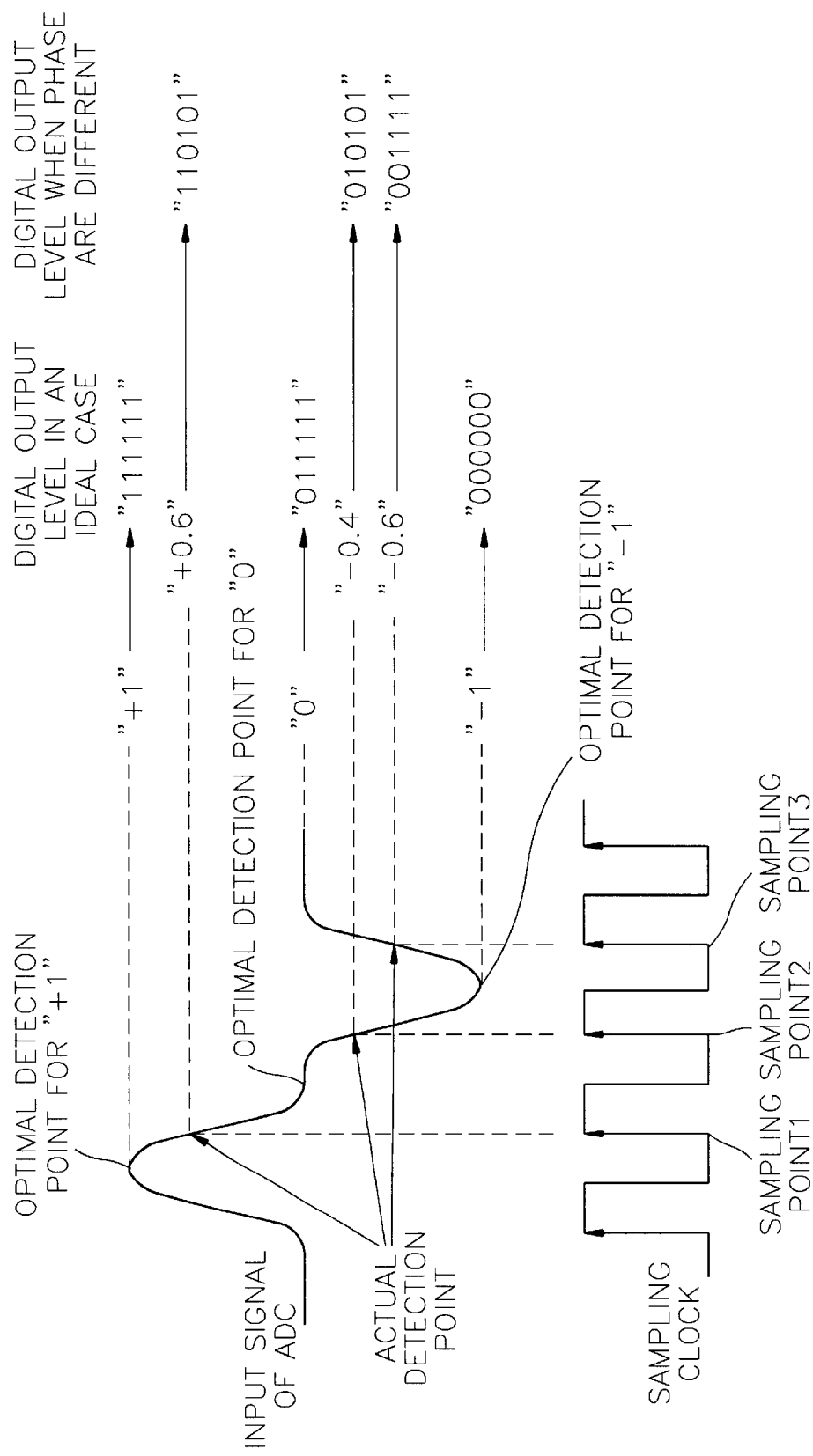
FIG. 5 shows a case where the phase of the optimal detection points and the phase of the sampling points do not coincide with each other, for assisting understanding of the present invention.

However, in a real case, the phase of the sampling points does not quite coincide with that of the optimal detection points of the input reproduced signal. An example of this is shown in FIG. 5. In FIG. 5, since the sampling point has diverged from the optimal detection point by "0.4", the level of the digital output signal has diverged by the same amount. The digital Viterbi decoder 304 performs a soft decision based on the digital output level, so the Viterbi decoding performance is lowered according to the degree of divergence. That is, as the phase difference between the sampling points and the optimal detection points of the input reproduced signal decreases, performance of the digital Viterbi decoder 304 improves.

Thus, the present invention proposes incorporating the phase detector and error voltage generator 306, which allows near-ideal performance of the digital Viterbi decoder 304 by minimizing the phase difference. The phase detector and error voltage generator 306 measures the phase difference between the sampling points and the optimal detection points using the digital output level of the ADC 302, and converts the measured phase difference into an error voltage to shift the phase of the sampling clock signal of the ADC 302, thereby minimizing the phase difference.

Summing up the present invention, in recording and reproduction of an actual digital image signal, it is necessary to ensure compatibility among various systems, which may exchange signals of greatly varying amplitude and phase. Such change of amplitude is made up for by adopting an AGC amplifier. However, deterioration of the performance of the digital Viterbi decoder, caused by the change in phase as well as in amplitude, can be significant. Thus, the data detector of the present invention adopts the phase detector and error voltage generator 306 in order to compensate for any change in phase. That is, the phase of the sampling points of the ADC 302, as data detection points, is made to coincide with the phase of the optimal detection points. As a result, the error caused by the difference of phase is minimized, thereby enhancing the performance of the digital Viterbi decoder 304, and the overall performance for detecting the reproduced data.

Figure 6:
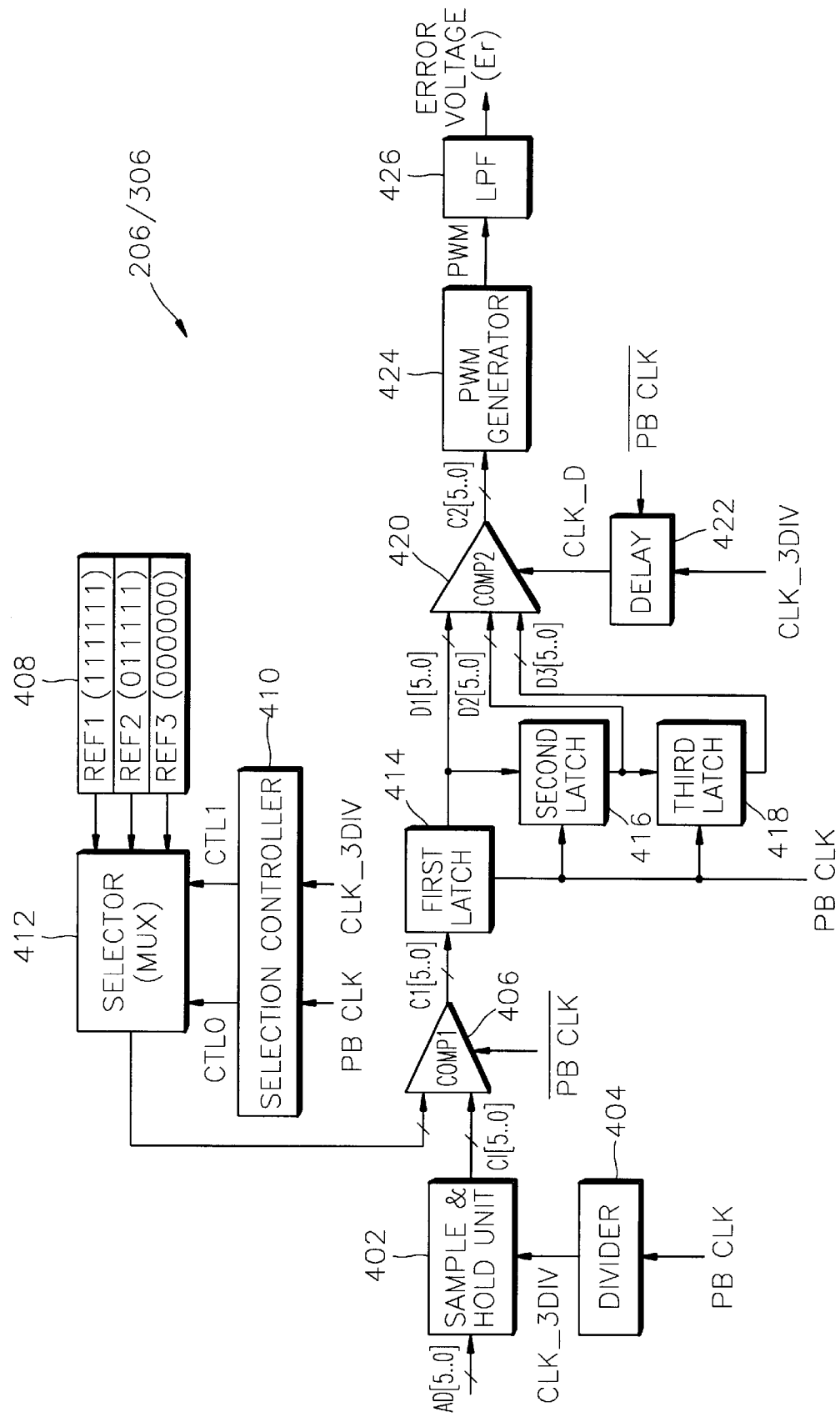
FIG. 6 is a detailed diagram showing the structure of a phase detector and error voltage generator shown in FIGS. 2 and 3 according to a first preferred embodiment of the present invention.

FIG. 6 is a detailed diagram showing the structure of the phase detector and error voltage generator shown in FIGS. 2 and 3, which will be described with further reference to FIGS. 3 and 7 through 10. In FIG. 6, the output AD[5 . . . 0] of the ADC 302 shown in FIG. 3 is input to a sample & hold unit 402. The output AD[5 . . . 0] is shown in FIG. 7B.

A clock signal CLK_3DIV is input from a divider 404 to the sample & hold unit 402, as shown in FIG. 7C. The divider 404 generates the clock signal CLK_3DIV whose frequency is equal to ⅓ of that of the playback clock signal PB CLK, in synchronization with the playback clock signal PB CLK of FIG. 7A generated by the clock generator 124. The division ratio of the divider 404 satisfies a condition of ⅓n, where n is an integer.

The sample & hold unit 402 samples a digital detection value with respect to one of "+1", "0" and "−1" during a sampling period, and holds the sampled value during two sampling periods, thereby selecting one of three detection points shown in FIG. 7D and applying the selected one to a first comparator 406. Even though the digital level detected at the sampling point corresponding to the optimal detection point for "+1" is sampled as an example, the output AD[5 . . . 0] of the ADC 302 may be sampled at other points.

The first comparator 406 compares the output signal CI[5 . . . 0] of the sample & hold unit 402, shown in FIG. 7D, consecutively with reference levels REF1, REF2 and REF3 shown in FIG. 7E, to output the absolute values of the differences.

Specifically, a reference level generator 408 generates reference levels REF1 (111111), REF2 (011111) and REF3 (000000) with respect to the optimal detection points "+1", "0" and "−1", respectively, and outputs the result to a selector 412 comprised of a multiplexer (MUX).

Figure 8A:
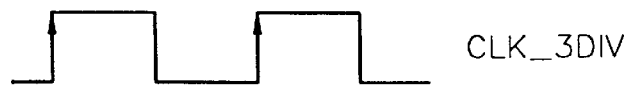
FIGS. 8A through 8D are timing diagrams of a selection controller shown in FIG. 6.
Figure 8B:
Figure 8C:
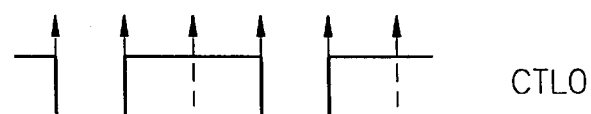
Figure 8D:

A selection controller 410 receives the divided clock signal CLK_3DIV of FIG. 8A and the playback clock signal PB CLK of FIG. 8B to generate a 2-bit selection control signal CTL0 and CTL1 and apply it to the selector 412.

FIG. 8E is a table of combinations of the 2-bit selection control signal generated by the selection controller 410. The selection control signal CTL0 and CTL1 is used for selecting one of the three reference levels. For example, if the selection control signal is "00", the first reference level REF1 is selected, and if it is "10" or "11", the second and third reference levels REF2 and REF3 are selected, respectively. To generate the selection control signals in a different sequence from that shown in FIG. 8E, the selection controller 410 must be reinitialized using the divided clock signal CLK_3DIV.

On the other hand, if we define the data that are held by the sample and hold unit 402 for 1 cycle of the divided clock signal CLK_3DIV as "1 word", then during each word of the output signal CI[5 . . . 0] of the sample and hold unit 402, as shown in FIG. 7D, three reference levels REF1, REF2 and REF3, selected by the selector 412 and shown in FIG. 7E, are input to the first comparator 406.

The first comparator 406 operates according to an inverted playback clock signal $\overline{PB\,CLK}$ shown in FIG. 7F, and compares every word of the output signal CI[5 . . . 0] of the sample & hold unit 402 with each of the reference levels REF1, REF2 and REF3 to output the differences C1[5 . . . 0] as shown in FIG. 7G. That is, if the 1 word output signal CI[5 . . . 0] of the sample and hold unit 402 is input, the first comparator 406 measures the difference with respect to an optimal detection point for "+1" at the first cycle of the inverted playback clock signal $\overline{PB\,CLK}$, the difference with respect to an optimal detection point for "0" at the second cycle, and the difference with respect to an optimal detection point for "−1" at the third cycle thereof. The comparison order of the three detection points may be changed if desired.

First, second and third latches 414, 416 and 418 may each be composed of a D flip-flop. The first latch 414, the output of which is shown in FIG. 7H, acts as a buffer for synchronizing output signals of the second and third latches 416 and 418. The second latch 416 delays the output signal C1[5 . . . 0] of the first comparator 406 by 1 cycle of the reproduced signal according to the playback clock signal PB CLK, and outputs the delayed signal D2[5 . . . 0] as shown in FIG. 7I. The third latch 418 delays the output signal D2[5 . . . 0] of the second latch 416 by 1 cycle of the reproduced signal according to the playback clock signal PB CLK, and outputs the delayed signal D3[5 . . . 0] as shown in FIG. 7J.

Every word of the output signal CI[5 . . . 0] of the sample & hold unit 402 is compared with each of the three optimal detection points, using the first, second and third latches 414, 416 and 418, and the difference signals obtained from the comparison are output to a second comparator 420 at the same time.

If the sampling of the input reproduced signal AD[5 . . . 0] output from the ADC 302 is performed at the first sampling point shown in FIG. 4, corresponding to the optimal detection level "111111" for "+1", the output signal D3[5 . . . 0] of the third latch 418 becomes "000000", the output signal D2[5 . . . 0] of the second latch 416 becomes "100000", and the output signal D1[5 . . . 0] of the first latch 414 becomes "111111".

In the same manner, if the sampling of the input reproduced signal AD[5 . . . 0] is at the second sampling point of FIG. 4, the output signal D2[5 . . . 0] of the second latch 416 becomes "000000". Also, if the sampling of the input reproduced signal AD[5 . . . 0] is at the third sampling point of FIG. 4, the output signal D1[5 . . . 0] of the first latch 414 becomes "000000".

That is, the second comparator 420 determines where the optimal detection point of the current sampling point is, and how much difference is between the levels of the current sampling point and the optimal detection point. The second comparator 420 compares the output signals D1[5 . . . 0], D2[5 . . . 0] and D3[5 . . . 0] of the first, second and third latches 414, 416 and 418, to output the lowest of the three levels. The second comparator 420 uses the delayed clock signal CLK_D output from the delay 422 as a driving clock signal in order to simultaneously compare three comparison levels of the signal C1[5 . . . 0] output from the first comparator 406 which has compared one word of the output signal CI[5 . . . 0] of the sample & hold unit 402 with each reference level. A delay 422 delays the output signal CLK_3DIV of the divider 404 according to the inverted playback clock signal $\overline{PB\,CLK}$, and outputs the delayed clock signal CLK_D shown in FIG. 7K. The output signal C2[5 . . . 0] of the second comparator 420 is shown in FIG. 7L.

For example, if the sampling is at the first sampling point shown in FIG. 4, the output of the second comparator 420 becomes "000000". Also, the output C2[5 . . . 0] of the second comparator 420 becomes "001010" at the first sampling point shown in FIG. 5.

A pulse width modulation (PWM) generator 424 varies the pulse width (duty cycle) of its output signal PWM with respect to the change in its input signal. The output C2[5 . . . 0] of the second comparator 420, which is input to the PWM generator 424, ranges from "000000" (zero phase difference) at the least, to "011111" (180° phase difference) at the highest. The output signal PWM of the PWM generator 424 is input to a low pass filter (LPF) 426.

FIG. 9A shows the digital level input to the PWM generator 424 according to the phase difference, and FIGS. 9B and 9C are operational waveforms of the output signals the PWM generator 424 and the LPF 426, respectively, according to the phase difference. That is, with respect to the input digital levels from "000000" to "011111" of the PWM generator 424, as shown in FIG. 9A, the pulse width of the output signal PWM of the PWM generator 424 ranges from zero width to maximum width as shown in FIG. 9B. The higher the digital level, the wider the pulse width of PMW signal. The LPF 426 generates voltage in proportion to the pulse width of the output signal PWM of the PWM generator 424, as shown in FIG. 9C. The output C2[5 . . . 0] of the second comparator 420, corresponding to the measured phase difference, is thus converted to an error voltage (Er) by the PWM generator 424 and the LPF 426.

Figure 10:
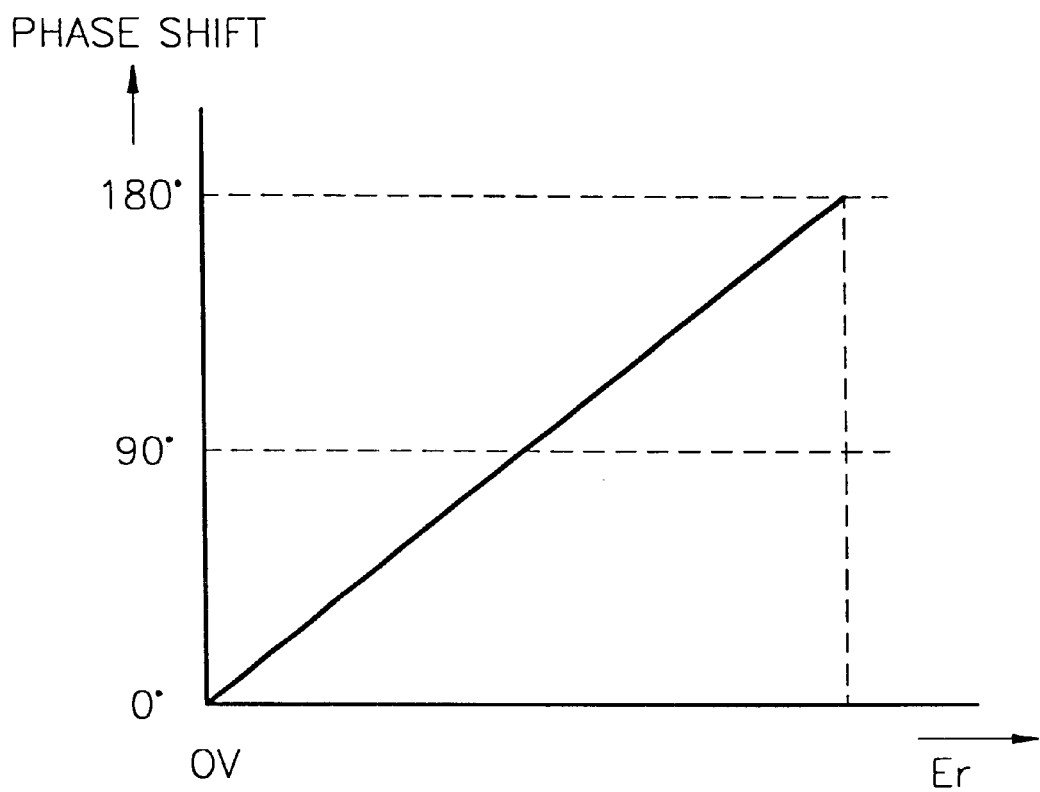
FIG. 10 is a diagram showing the operational principle of a phase shifter of FIG. 3.

The error voltage Er generated by the LPF 426 is applied to the phase shifter 308 shown in FIG. 3, and the phase shifter 308 shifts the phase of the sampling clock signal applied to the ADC 302 according to the principle of FIG. 10. That is, as shown in FIG. 10, the higher the error voltage Er generated by the LPF 426, the more the phase of the sampling clock signal is shifted. The series of operations continues until the phase of the sampling points of the ADC 302 coincides with the phase of the optimal detection points of the reproduced input signal. If the conditions reach the optimum, the optimal state is held until a phase error is generated.

Figure 11:
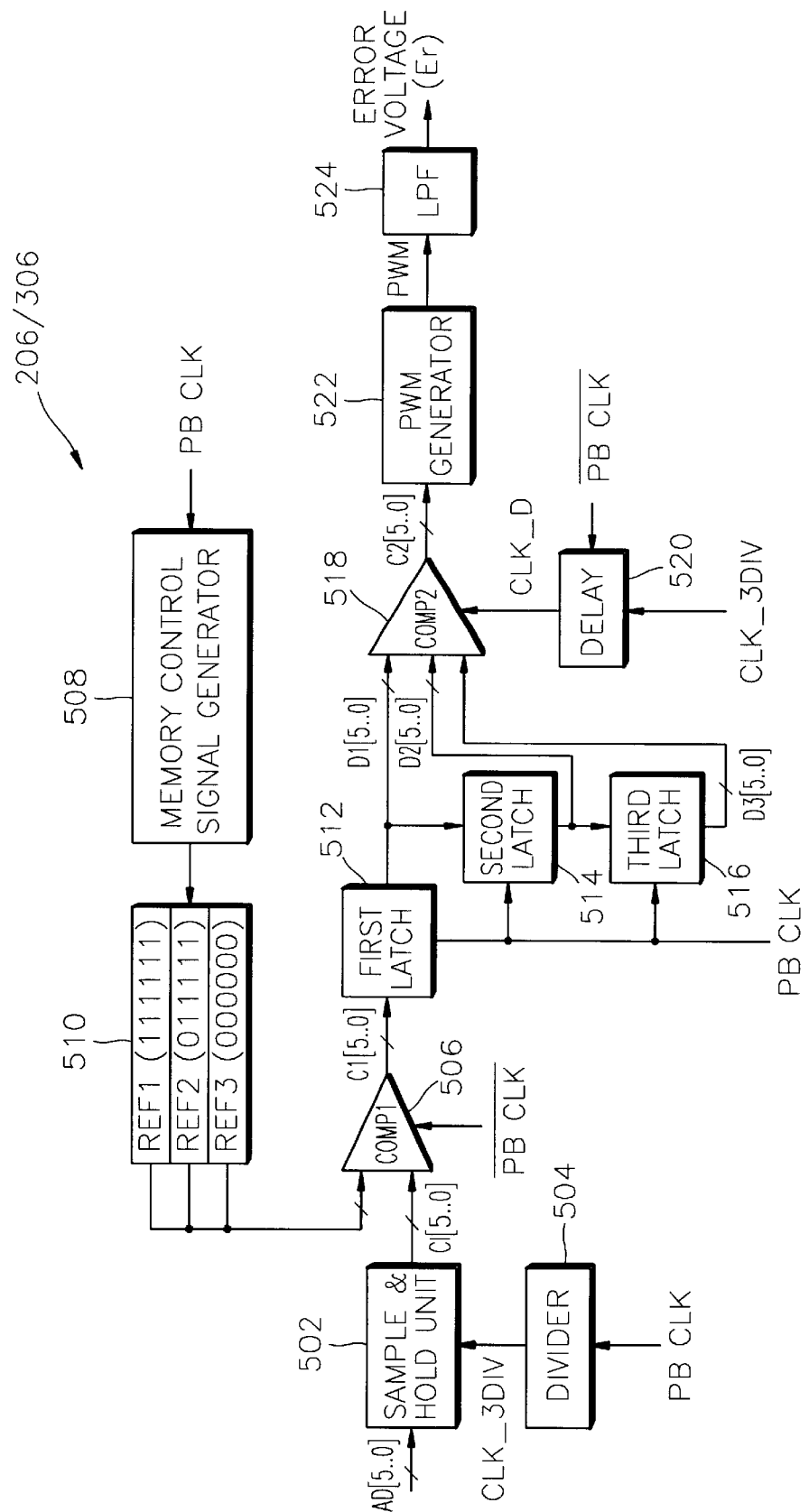
FIG. 11 is a detailed diagram showing the structure of the phase detector and error voltage generator shown in FIGS. 2 and 3 according to a second embodiment of the present invention.

FIG. 11 is a detailed diagram showing the structure of a second embodiment of the phase detector and error voltage generator shown in FIGS. 2 and 3 according to the present invention. Compared to the phase detector and error voltage generator shown in FIG. 6, a sample & hold unit 502, a divider 504, first and second comparators 506 and 518, first, second and third latches 512, 514 and 516, a delay 520, a PWM generator 522 and a LPF 524 are the same as those of FIG. 6. Thus, a detailed explanation of these components will be omitted, and the following explanation will focus on a memory control signal generator 508 and a reference level generator 510.

In FIG. 11, in a case where the reference level generator 510 for generating reference levels REF1, REF2 and REF3 is comprised of a memory, the memory control signal generator 508 outputs a memory control signal to the reference level generator 510 such that the three reference levels REF1, REF2 and REF3 are repeatedly read out in a predetermined sequence according to the playback clock signal PB CLK. The readout sequence of the three reference levels governed by the memory control signal generator 508 may be changed through software reprogramming, without any change in hardware being required.

Figure 12:
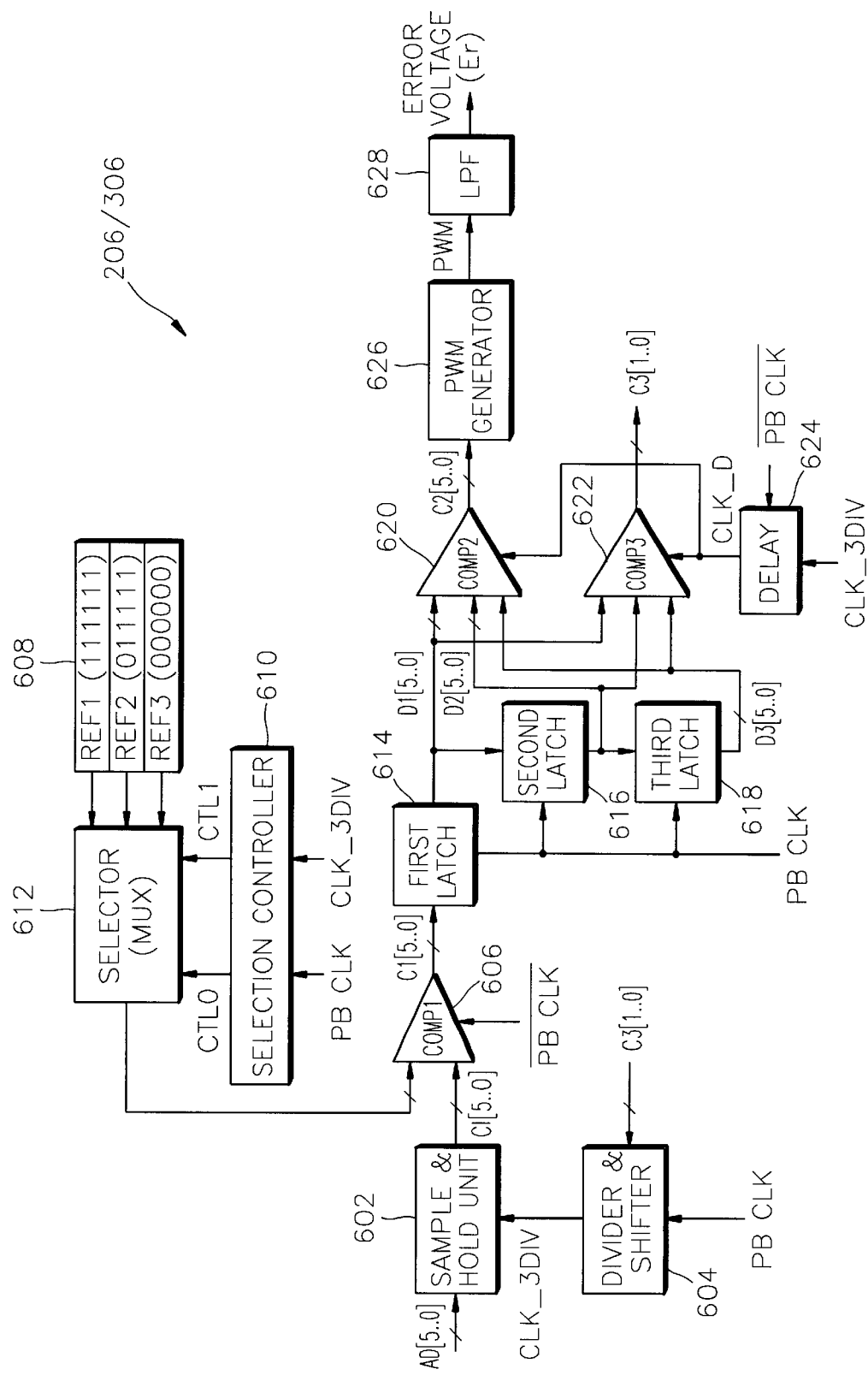
FIG. 12 is a detailed diagram showing the structure of the phase detector and error voltage generator shown in FIGS. 2 and 3 according to a third embodiment of the present invention.

FIG. 12 shows the structure of a third embodiment of the phase detector and error voltage generator shown in FIGS. 2 and 3. Compared to the phase detector and error voltage generator shown in FIG. 6, a sample & hold unit 602, first and second comparators 606 and 620, a reference level generator 608, a selection controller 610, a selector 612, first, second and third latches 614, 616 and 618, a delay 624, a PWM generator 626 and a LPF 628 are the same as those of FIG. 6. Thus, a detailed explanation of these components will be omitted, and the following explanation will focus on a divider & shifter 604 and a third comparator 622.

In FIG. 12, the third comparator 622 receives output signals D1[5 . . . 0], an D2[5 . . . 0] and D3[5 . . . 0] of the first, second and third latches 614, 616 and 618 according to the delayed clock CLK_D generated by the delay 624 to determine whether the current sampling point is an optimal detection point for "+1", "0" or "−1", and then outputs 2 bits of location information C3[1 . . . 0] on the optimal detection point to the divider & shifter 604. For example, if the output D1[5 . . . 0] of the first latch 614 is the least among the three, then "11" is output as the 2-bit location information. Also, "01" or "00" are output as the 2-bit location information if the outputs D2[5 . . . 0] or D3[5 . . . 0] of the second or third latches 616 or 618 are the least, respectively.

The divider & shifter 604 outputs the divided clock signal CLK_3DIV whose phase is shifted, to the sample & hold unit 602, using the location information output C3[1 . . . 0] from the third comparator 622 such that the sampling is performed at the sampling point having the least phase difference among three points shown FIG. 4. Then, the sampling is continued at the sampling point corresponding to the output C3[1 . . . 0] of the third comparator 622 until the phase of the detection points of the input reproduced signal coincides with the phase of the optimal detection points.

Specifically, if the output C3[1 . . . 0] of the third comparator 622 is "11", it means that an optimal detection point for "−1" is selected as a sampling point. If the output C3[1 . . . 0] is "01", it means that an optimal detection point for "0" is selected as a sampling point. If the output C3[1 . . . 0] is "00", it means that an optimal detection point for "+1" is selected as a sampling point. Thus, the divider & shifter 604 may set the location information of a desired sampling point such that the sampling can be performed at the desired sampling point among the three. Then, the sampling is continued at the desired sampling point until the phase of the detection points of the input reproduced signal coincides with that of the optimal detection points.

Figure 13:
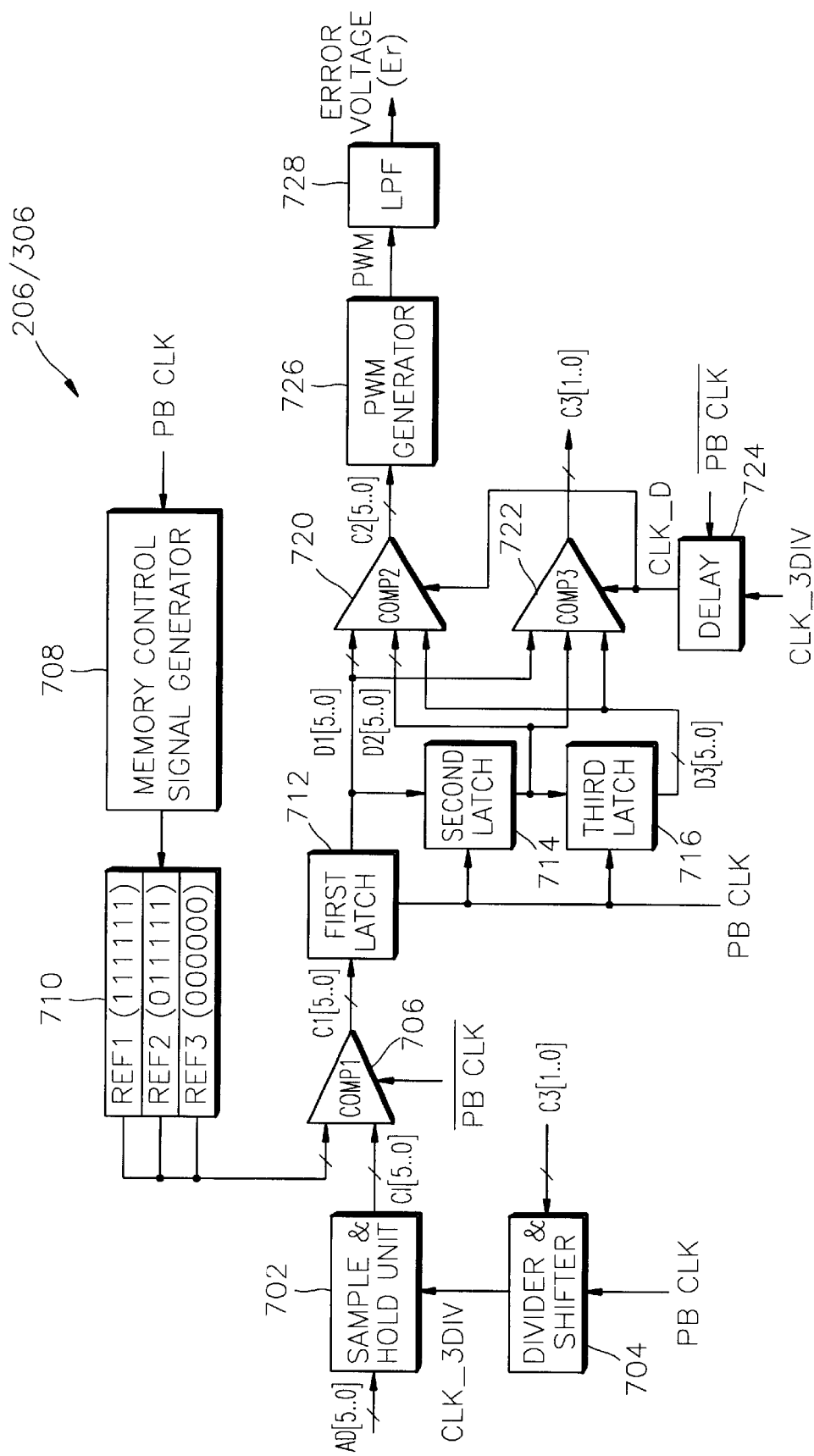
FIG. 13 is a detailed diagram showing the structure of the phase detector and error voltage generator shown in FIGS. 2 and 3 according to a fourth embodiment of the present invention.

FIG. 13 is a detailed diagram showing the structure of a fourth embodiment of the phase detector and error voltage generator shown in FIGS. 2 and 3. The phase detector and error voltage generator of FIG. 13 includes a sample & hold unit 702, first and second comparators 706 and 720, a memory control signal generator 708, a reference level generator 710, first, second and third latches 712, 714 and 716, a delay 724, a PWM generator 726, a LPF 728, which are the same as those of the phase detector and error voltage generator shown in FIG. 11, and also includes a divider & shifter 704 and a third comparator 722 which are the same as those of the phase detector and error voltage generator shown in FIG. 12.

As described above, the data detector and the data detection method according to the present invention can detect data of various input reproduced signals, with improved performance.

What is claimed is:

1. A data detector comprising:
    a converter for converting received data into digital data according to a sampling clock signal;
    a maximum likelihood decoder for performing maximum likelihood decoding on the digital data; and
    a generator for measuring a phase difference between the digital data sampled at a desired detection point among a predetermined number of optimal detection points of the received data and each of a number of reference levels corresponding to the predetermined number of optimal signal according to the measured phase difference, wherein the generator comprises:
        a detector for detecting the digital data sampled at the desired detection point among the number of optimal detection points, said detection comprising a divider for dividing a system clock signal by $\frac{1}{n}$ and outputting a divided clock signal, wherein n is an integer, and a sample and hold unit for holding the digital data which is sampled at the desired detection point among the predetermined number of optimal detection points according to the divided clock signal;
        a calculator for calculating absolute values of the differences between the level of the digital data and each reference level, and outputting the results as a phase error, and calculator comprising a reference level generator for generating a first reference level representing the optimal detection point "+1" value, a second reference level representing the optimal detection point for a "0" value and a third reference level representing the optimal detection point for "−1" value, a selector for selecting one of the first, second and third reference levels, a selection controller for outputting a selection control signal to the selector such that the first, second and third reference levels are selected by the selector in a predetermined sequence according to the system clock signal and the divided clock signal input into the selection controller, a first comparator for comparing an output level of the detector with each reference level selected by the selector and for outputting the differences as an output, and a second comparator for comparing each difference output from the first comparator to output the least difference as the phase error; and
    a control signal generator for generating a voltage corresponding to the phase error and outputting the voltage as the control signal.

2. The data detector of claim 1, further comprising:
    a phase shifter for shifting the phase of the sampling clock signal according to the control signal.

3. The data detector of claim 1, further comprising a third comparator for outputting location information of the optimal detection point, corresponding to the least difference output from the first comparator.

4. The data detector of claim 3, wherein:
    the divider divides the system clock signal by $\frac{1}{n}$ and shifts the phase of the divided clock signal according to the location information, to output a phase-shifted divided clock signal; and
    the sample & hold unit holds the digital data sampled at one of the optimal detection points according to the phase-shifted divided clock signal.

5. The data detector of claim 3, wherein the first comparator is driven by an inverted system clock signal, and the second and third comparators are driven by the divided clock signal which is delayed by a predetermined time.

6. The data detector of claim 1, wherein the calculator further comprises:
    a first latch for delaying the output of the first comparator according to the system clock signal, to output a first delayed signal to the second comparator;
    a second latch for delaying the first delayed signal according to the system clock signal to output a second delayed signal to the second comparator; and
    a third latch for delaying the second delayed signal according to the system clock signal to output a third delayed signal to the second comparator.

7. The data detector of claim 1, wherein the control signal generator comprises:
    a pulse width modulation generator for generating a pulse width modulation signal according to the phase error; and
    a low pass filter for converting the pulse width modulation signal into the voltage to output as the control signal.

8. The data detector of claim 1, wherein each of the reference levels corresponds to a different one of the optimal detection points.

9. A data detector comprising:
    a converter for converting received data into digital data according to a sampling clock signal;
    a maximum likelihood decoder for performing maximum likelihood decoding on the digital data; and
    a generator for measuring a phase difference between the digital data sampled at a desired detection point among a predetermined number of optimal detection points of the received data and each of a number of reference levels corresponding to the predetermined number of optimal detection points, and for generating a control signal for changing a phase of the sampling clock signal according to the measured phase difference, wherein the generator comprises:
        a detector for detecting the digital data sampled at the desired detection point among the number of optimal detection points;
        a calculator for calculating absolute values of the differences between the level of the digital data and each reference level, and outputting the results as a phase error, said calculator comprising a memory for storing a first reference level representing the optimal detection point for a "+1" value, a second reference level representing the optimal detection point for a "0" value, and a third reference level representing the optimal detection point for a "−1" value, a memory control signal generator for generating a memory control signal that the first, second and third reference levels are repeatedly read out from the memory in a predetermined sequence, a first comparator for comparing an output level of the detector with each reference level output from the memory, to output the differences, and a second comparator for comparing each difference output from the first comparator, to output the least difference as the phase error; and a control signal generator for generating a voltage corresponding to the phase error and outputting the voltage as the control signal.

10. The data detector of claim 9, further comprising a third comparator for outputting location information of the optimal detection point, corresponding to the least of the differences output from the first comparator.

11. The data detector of claim 10, wherein the detector comprises:
   a divider for dividing the system clock signal by 1/3n and for shifting the phase of the divided clock signal according to the location information, to output a phase-shifted divided clock signal; and
   a sample & hold unit for holding the digital data sampled at one of the optimal detection points according to the phase-shifted divided clock signal.

12. A data detector for a digital data recording and reproducing apparatus with a maximum likelihood decoder, comprising:
   an analog-to-digital converter for converting an input reproduced signal into digital data according to a sampling clock signal and for applying the digital data to the maximum likelihood decoder; and
   a generator for measuring a phase difference between the digital data sampled at a desired detection point among a predetermined number of optimal detection points of the digital data, and each of a number of reference levels corresponding to the predetermined number of optimal detection points, and for generating a control signal for changing a phase of the sampling clock signal according to the measured phase difference, wherein the generator comprises:
      a detector for detecting the digital data sampled at the desired detection point among the number of optimal detection points, said detector comprising a divider for dividing a system clock signal by 1/3n and outputting a divided clock signal, wherein n is an integer, and a sample & hold unit for holding the digital data which is sampled at the desired detection point among the predetermined number of optimal detection points, according to the divided clock signal;
      a calculator for calculating absolute values of the differences between the level of the digital data and each reference level, and outputting the results as a phase error, said calculator comprising a reference level generator for generating a first reference level representing the optimal detection point for a "+1" value, a second reference level representing the optimal detection point for a "0" value and a third reference level representing the optimal detection point for a "−1" value, a selector for selecting one of the first, second and third reference levels, a selection controller for outputting a selection control signal to the selector such that the first, second and third reference are selected by the selector in a predetermined sequence according to the system clock signal and the divided clock signal input into the selection controller, a first comparator for comparing an output level of the detector with each reference level selected by the selector and for outputting the differences as an output, and a second for comparing each difference output from the first comparator to output the least difference as the phase error; and
      a control signal generator for generating a voltage corresponding to the phase error and outputting the voltage as the control signal.

13. The data detector of claim 12 further comprising:
   a phase shifter for shifting the phase of the sampling clock signal according to the control signal.

14. The data detector of claim 12, further comprising a third comparator for outputting location information of the optimal detection point, corresponding to the least difference output from the first comparator.

15. The data detector of claim 14, wherein:
   the divider divides the system clock signal by 1/3n and shifts the phase of the divided clock signal according to the location information, to output a phase-shifted divided clock signal; and
   the sample & hold unit holds the digital data sampled at one of the optimal detection points according to the phase-shifted divided clock signal.

16. The data detector of claim 12, wherein the calculator further comprises:
   a first latch for delaying the output of the first comparator according to the system clock signal, to output a first delayed signal to the second comparator;
   a second latch for delaying the first delayed signal according to the system clock signal to output a second delayed signal to the second comparator; and
   a third latch for delaying the second delayed signal according to the system clock signal to output a third delayed signal to the second comparator.

17. The data detector of claim 12, wherein the control signal generator comprises:
   a pulse width modulation generator for generating a pulse width modulation signal according to the phase error; and
   a low pass filter for converting the pulse width modulation signal into the voltage to output as the control signal.

18. The data detector of claim 17, wherein each of the reference levels corresponds to a different one of the optimal detection points.

19. The data detector of claim 12, wherein each of the reference levels corresponds to a different one of the optimal detection points.

20. A data detector for a digital data recording and reproducing apparatus with a maximum likelihood decoder, comprising:
   an analog-to-digital converter for converting an input reproduced signal into digital data according to a sampling claock signal and for applying the digital data to the maximum likelihood decoder; and
   a generator for measuring a phase difference between the digital data sampled at a desired detection point among a predetermined number of optimal detection points of the digital data, and each of a number of reference levels corresponding to the predetermined number of optimal detection points, and for generating a control signal for changing a phase of the sampling clock signal according to the measured phase difference, wherein the generator comprises:
      a detector for detecting the digital data sampled at the desired detection point among the number of optimal points;
      a calculator for calculating absolute values of the difference between the level of the digital data and each reference level, and outputting the results as a phase error, said calculator comprising a memory for sorting s first reference level representing the optimal detection point for a "−1" value, a second reference level representing the optimal detection point for a "0" value, and a third reference level representing the optimal detection point for a "−1" value, a memory control signal generator for generating a memory control signal such that the first, second and third reference levels are repeatedly read out from the memory in a predetermined sequence, a first comparator for comparing an output level of the detector with each reference level output from the memory, to output the differences, and a second comparator for comparing each difference output from the first comparator, to output the least difference as the phase; and a control signal generator for generating a voltage corresponding to the phase error and outputting the voltage as the control signal.

21. The data detector of claim 20, further comprising a third comparator for outputting location information of the optimal detection point, corresponding to the least of the differences output from the first comparator.

22. The data detector of claim 21, wherein the detector comprises:

a divider for dividing the system clock signal by ⅓n and for shifting the phase of the divided clock signal according to the location information, to output a phase-shifted divided clock signal; and a sample & hold unit for holding the digital data sampled at one of the optimal detection points according to the phase-shifted divided clock signal.

23. A data detection method comprising the steps of:

(a) converting a received signal into digital data according to a sampling clock signal;

(b) performing maximum likelihood decoding on the digital data; and (c) measuring a phase difference between the digital data sampled at a desired detection point among a predetermined number of optimal detection points of the received signal and each of a number of reference levels corresponding to the predetermined number of optimal detection points, and for generating a control signal for changing a phase of the sampling clock signal according to the measured phase difference, wherein the stop (c) comprises the sub-step of:

(c11) dividing an input system clock signal by ⅓n and outputting a divided clock signal, where n is an integer;

(c12) outputting the sampled digital data at one of the predetermined number of optimal detection points according to the divided clock signal;

(c13) generating a first reference level representing the optimal detection point for a "−1" value, a second reference level representing the optimal detection point for a 0" value and a third reference level representing the optimal detection point for a −1" value;

(c14) selecting the first, second and third reference levels one at a time in a predetermined sequence;

(c15) comparing the sampled digital data with each reference level generated in the step (c13) to output the differences therebetween;

(c16) outputting the least difference as a phase error;

(c17) generating a pulse width modulation signal according to the phase error into; and (c18) converting the pulse width modulation signal into a voltage and outputting the voltage as the control signal.

24. The method of claim 23, further comprising the step of:

(d) shifting the phase of the sampling clock signal according to the control signal and feeding back a shifted clock signal to the step (a).

25. The method of claim 23, wherein the step (c) comprises the sub-steps of:

(c1) detecting the digital data sampled at the desired detection point among the predetermined number of optimal detection points;

(c2) calculating absolute values of the differences between the level of the sample data and of each reference level, and outputting the results as a phase error; and (c3) generating voltage corresponding to the phase error and outputting the voltage as the control signal.

26. A data detection method comprising the steps of:

(a) converting a received signal into digital data according to a sampling clock signal;

(b) performing maximum likelihood decoding on the digital data; and (c) measuring a phase difference between the digital data sampled at a desired detection point among a predetermined number of optimal detection points of the received signal and each of a number of reference levels corresponding to the predetermined number of optimal detection points, and for generating a control signal for changing a phase of the sampling clock signal according to the measured phase difference, wherein the step (c) comprises the sub-steps of:

(c21) generating a first reference level representing the optimal detection point for "+1" value, a second reference level representing the optimal detection point for a "0" value and a third reference level representing the optimal detection point for "−1" value;

(c22) selecting the first, second and third reference level one at a time in a predetermined sequence;

(c23) outputting the sampled digital data at one of the predetermined number of optimal detection points according to a changed clock signal;

(c24) comparing the sampled digital data with each reference level generated in the step (21) to output the differences therebetween;

(c25) outputting the least difference as a phase error;

(c26) outputting location information of the optimal detection point corresponding to the least difference;

(c27) dividing the system clock signal by ⅓n, and shifting the phase of the divided clock signal according to the location information to generate the changed clock signal, wherein n is an integer;

(c28) generating a pulse width modulation signal according to the phase error; and (c29) converting the pulse width modulation signal into a voltage and outputting the voltage as the control signal.

27. A data detection method comprising the steps of:

(a) converting a received signal into digital data according to a sampling clock signal;

(b) performing maximum likelihood decoding on the digital data; and (c) measuring a phase difference between the digital data sampled at a desired detection point among a predetermined number of optimal detection points of the received signal and each of a number of reference levels corresponding to the predetermined number of optimal detection points, and for generating a control signal for changing a phase of the sampling clock signal according to the measured phase difference, wherein the step (c) comprises the substeps of:

(c31) dividing an input clock signal by $\frac{1}{3}n$ and outputting a divided clock signal, where n is an integer;

(c32) outputting the sampled digital data at one of the predetermined number of optimal detection points according to the divided clock signal;

(c33) repeatedly reading out in sequence from a first reference level representing the optimal detection point for a "+1" value, a second reference level representing the optimal detection point for a "0" value and a third reference level representing the optimal detection point a "−1" value;

(c34) comparing the sampled digital data with each reference level generated in the step (c33) to output differences therebetween;

(c35) outputting the least difference as a phase error;

(c36) generating a pulse width modulation signal according to the phase error; and (c37) converting the pulse width modulation signal into a voltage and outputting the voltage as the control signal.

28. A data detection method comprising the steps of:

(a) converting a received signal into digital data according to a sampling clock signal;

(b) performing maximum likelihood decoding on the digital data; and (c) measuring a phase difference between the digital data sampled at a desired detection point among a predetermined number of optimal detection points of the received signal and each of a number of reference levels corresponding to the predetermined number of optimal detection points, and for generating a control signal for changing a phase of the sampling clock signal according to the measured phase difference, wherein the step (c) comprises the sub-steps of:

(c41) outputting the sampled digital data at one of the predetermined number of optimal detection points according to a changed clock signal;

(c42) repeatedly reading out in sequence from a memory a first reference level representing the optimal detection point for a "+1" value, a second reference level representing the optimal detection point for a "0" value and a third reference level representing the optimal detection point for a "−1" value;

(c43) comparing the sampled digital data with each reference level generated in the step (c42) to output the differences therebetween;

(c44) outputting the least difference as a phase error;

(c45) outputting location information of the optimal detection point corresponding to the least difference;

(c46) dividing a system clock signal by $\frac{1}{3}n$, and shifting a phase of the divided clock signal according to the location information to generate the changed clock signal, wherein n is an integer;

(c47) generating a pulse width modulation signal according to the phase error; and (c48) converting the pulse width modulation signal into a voltage and outputting the voltage as the control signal.

* * * * *